(12) United States Patent
Wiaderny

(10) Patent No.: US 8,684,409 B2
(45) Date of Patent: Apr. 1, 2014

(54) AIRBAG HAVING A SINGLE-PIECE REBOUND STRAP DEFINING TWO INFLATION STAGES

(75) Inventor: Marcin Wiaderny, Wroclaw (PL)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/809,802

(22) PCT Filed: Jul. 4, 2011

(86) PCT No.: PCT/EP2011/061201
§ 371 (c)(1),
(2), (4) Date: Jan. 11, 2013

(87) PCT Pub. No.: WO2012/010404
PCT Pub. Date: Jan. 26, 2012

(65) Prior Publication Data
US 2013/0113196 A1 May 9, 2013

(30) Foreign Application Priority Data
Jul. 23, 2010 (DE) .......................... 10 2010 032 016

(51) Int. Cl.
*B60R 21/2338* (2011.01)
(52) U.S. Cl.
CPC ... *B60R 21/2338* (2013.01); *B60R 2021/23382* (2013.01); *B60R 2021/23384* (2013.01)
USPC ...................................................... 280/743.2
(58) Field of Classification Search
CPC ................. B60R 21/2338; B60R 2021/23382

USPC ....................................... 280/739, 740, 743.2
See application file for complete search history.

(56) References Cited

U.S. PATENT DOCUMENTS 5,362,101 A * 11/1994 Sugiura et al. ............. 280/743.2
6,616,184 B2 * 9/2003 Fischer ....................... 280/743.2
(Continued)

FOREIGN PATENT DOCUMENTS

| EP | 0 838 377 B1 | 2/2002 |
| EP | 1 481 854 A1 | 1/2004 |
| EP | 2 174 843 A1 | 4/2010 |
| GB | 2 416 152 A | 1/2006 |

OTHER PUBLICATIONS

PCT International Search Report—Oct. 31, 2011.

*Primary Examiner* — Paul N Dickson
*Assistant Examiner* — Robert A Coker
(74) *Attorney, Agent, or Firm* — Brinks Gilson & Lione

(57) ABSTRACT

An airbag module having an airbag and an inflation device, wherein at least one rebound strap for controlling the inflation of the airbag is disposed in the airbag and attached to portions of the airbag that move away from each other when the airbag is inflated. A first, shorter rebound strip segment breaks after a first inflation stage and subsequently the airbag regions separate from each other until the second, longer segment of the rebound strap is tensioned and the inflation stage of the airbag is predefined by the second, longer segment of the rebound strap. The rebound strap thereof is formed from a uniform textile segment, the first, shorter segment of the rebound strap is formed as a tab cut out of the second, longer segment the tab being narrower and shorter than the second, longer segment of the rebound strap.

5 Claims, 1 Drawing Sheet

(56) References Cited

U.S. PATENT DOCUMENTS

| | | | |
|---|---|---|---|
| 7,195,281 B2* | 3/2007 | Williams et al. | 280/743.2 |
| 7,828,327 B2* | 11/2010 | Kai | 280/739 |
| 7,878,541 B2* | 2/2011 | Bustos Garcia et al. | 280/743.2 |
| 2001/0035639 A1 | 11/2001 | Amamori | |
| 2004/0026912 A1* | 2/2004 | Yamada et al. | 280/743.2 |
| 2007/0170709 A1* | 7/2007 | Braun et al. | 280/739 |

* cited by examiner

AIRBAG HAVING A SINGLE-PIECE REBOUND STRAP DEFINING TWO INFLATION STAGES

CROSS REFERENCE TO RELATED APPLICATIONS

This application claims priority to German Patent Application No. 10 2010 032 016.1, filed Jul. 23, 2010 and PCT/EP2011/061201, filed May 4, 2011.

FIELD OF THE INVENTION

The invention concerns an airbag module for installation in a motor vehicle with an airbag made from airbag material and an inflation device for the airbag, folded prior to triggering. The airbag includes at least one rebound strap in the interior of the airbag with two sections of varying length and width for the controlled inflation of the airbag. The rebound strap is attached to portions of the airbags that move in opposite directions during inflation of the airbag, and attached in such manner that a first shorter section of the rebound strap will be tensioned until reaching a preset breaking point during the first stage of inflation, and after the rupture of the first shorter portions of the rebound strap, the sections of the airbag will move in opposite directions until tensioning of the second longer section of the rebound strap, with the inflated state of the airbag at least in part predefined by the second longer section of the rebound strap.

BACKGROUND OF THE INVENTION

An airbag module with the above-referenced characteristics is described in EP 0 838 377 B 1. Insofar as a rebound strap is located inside the inflatable airbag for the control of its inflation characteristics, the rebound strap will have a first shorter section, tensioned by the inflating airbag or the airbag portions moving in opposite directions at the start of the inflation process. Once the effective inflation pressure inside the airbag exceeds the predetermined breaking point of the first section of the rebound strap, this first section of the rebound strap will rupture, so that the airbag can be inflated until the second, longer section of the rebound strap is tensioned, wherein the length and location of the second section of the rebound strap inside the airbag determined the final inflated shape of the airbag.

The design of a two-section rebound strap described in EP 0 83 8 377 B 1 is characterized by the flat mid-section of the rebound strap, formed by an elongated cut of material, from which the two rebound strap sections of varying length and width originate on both sides. The mid-section of the rebound strap is attached to the one airbag portion, with the respective free ends of the first section and the second section of the rebound strap attached to opposite portions of the airbag. When the respective airbag portion, including the attached mid-section of the rebound strap and the attached ends of the two rebound strap sections, move in opposite directions during inflation of the airbag, the first shorter section of the rebound strap will be tensioned initially, and following the rupture of the first section of the rebound strap, the second longer section of the rebound strap will be tensioned, determining the inflated shape of the airbag.

The known airbag module, or more specifically the arrangement of the rebound strap inside the airbag, entails the disadvantage of requiring a complex cut of the rebound strap, characterized by three sections with varying geometrical specifications.

In addition, three seams each are required for the attachment of the mid-section of the rebound strap to the airbag portion, and of the two ends of the two sections of the rebound strap to the other portion of the airbag. Furthermore, two spatially separate sections of the rebound strap run through the airbag, which may lead to problems when folding or inflating the airbag.

Therefore, the problem of this invention is to design an airbag module with the above-referenced characteristics in such fashion that the cost of fabrication and attachment of a two-section rebound strap inside the airbag will be reduced.

SUMMARY OF THE INVENTION

The fundamental feature of the present invention provides that the rebound strap and its two sections are formed from one uniform single piece perimeter cut of material, with the second longer section of the rebound strap defined by the length and width of the perimeter cut and opposite ends attached respectively to the portions of the airbag moving in opposite directions. The first shorter section of the rebound strap is formed by a flap with reduced width and shorter length than the second section of the rebound strap, cut from the second longer section with the respectively arranged inside cuts in the material, remaining connected to one end to part of the material perimeter cut, and the other cut-off end of the flap attached to the respective end of the second longer section of the rebound strap, thus forming a loop.

The invention has the advantage that the rebound strap with the two functionally required rebound strap sections can be produced relatively easily since only the first shorter section of the rebound strap is formed by a single piece cut of the material cut within the perimeter cut forming the second section of the rebound strap, in the dimensions given for the preset breaking point. Since one end of the first rebound strap section remains an integral part of the second section of the rebound strap, a special seam for the attachment of this end of the first rebound strap section to the airbag is not necessary. Thus, it is sufficient to attach the respective end of the cut in the material forming the second section of the rebound strap to the airbag material. In addition, only a single piece rebound strap is required, with the second longer section of the rebound strap forming a loop during installation, thus creating a type of double-layered rebound strap.

Per one exemplary embodiment of the invention, it can be provided that the cuts in the material forming the first shorter section of the rebound strap can be arranged in a U-shape within the perimeter of the second section, so that the cut-off flap as the first shorter section of the rebound strap will remain connected to the second longer section of the rebound strap along the open side of the material cuts arranged in a U-shape.

Concerning installation of the rebound strap or rebound strap sections, it can be provided that the cut-off end of the flap forming the first shorter section of the rebound strap is stitched to the end of the second longer section of the rebound strap. For this purpose, the rebound strap and its two rebound strap sections may be prefabricated in such manner that only the two ends of the second longer rebound strap section must be attached to the respective airbag sections.

Alternatively, it can be provided that the cut-off end of the flap forming the first shorter section of the rebound strap is attached by a single seam to the end of the second longer section of the rebound strap and the material of the airbag. For this purpose, the material layers of the ends of the first shorter rebound strap section, of the second longer rebound strap section, and the airbag material are connected to each other by a single seam created in one production step.

As regards the arrangement of the rebound straps inside an airbag, it may be provided that two parallel rebound straps are located inside the airbag, with their ends connected to the respective reinforcements, attached to the airbag sections moving in opposite directions.

BRIEF DESCRIPTION OF THE DRAWINGS

The drawing shows one exemplary embodiment of the invention, which is described in the following, wherein.

DETAILED DESCRIPTION OF THE INVENTION

Figure 1:
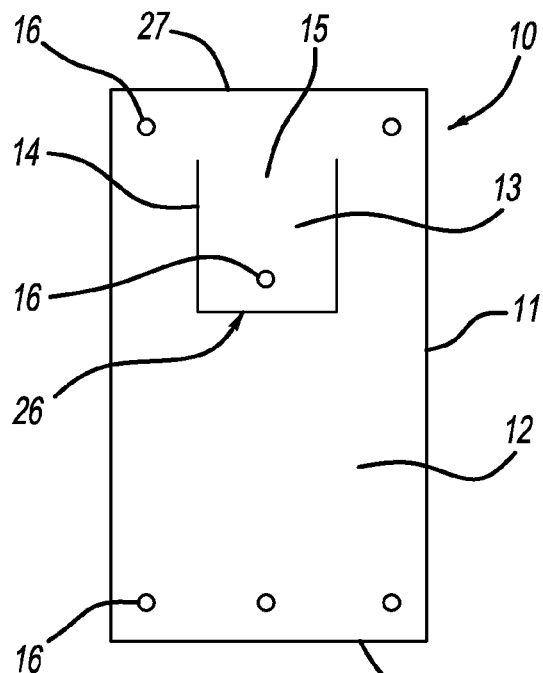
FIG. 1 shows a rebound strap with its two rebound strap sections in a detail drawing in a top view.

As shown in FIG. 1, rebound strap 10 with two rebound strap sections is characterized by its second longer rebound strap section 12, which is identical to material cut 11 from one layer of material (i.e. the outer perimeter of strap 10 and that of second section 12 are the same). Thus, the production of rebound strap 10 requires only one perimeter material cut 11 from one layer of material, with material cut 11 in turn serving as the perimeter of second longer section 12 of the rebound strap 10. Rebound strap 10 has a rectangular shape corresponding to its longer rebound strap section 12, with the respective positioning openings 16 located at the opposing short sides with ends 27 and 28.

The first shorter rebound strap section 13 of rebound strap 10 is formed by the U-shape arrangement of material cuts 14 within the perimeter material cut 11 in such manner that the resulting freely cut flap, acting as the first shorter rebound strap section 13, remains attached to the short (attached) side 15 of the U-shape arrangement of cuts 14 as a single piece with material cut 11 or the second longer section 12 of the rebound strap 10, and thus is still integrally connected at this end to the second longer rebound strap 12.

At its separated end 26, the first shorter rebound strap section 13, taken from the second longer rebound strap section 12, is provided with positioning opening 16, whereby it is clear that the first shorter rebound strap section 13 with its free separated end 26 may be placed on the opposite end 28 of the second longer rebound strap section 12 in such manner that positioning opening 16 will align the free edge of strap section 13 with the end 28 of the second longer rebound strap section 12 with positioning opening 16 located there. Thus when positioned in this manner, the second longer rebound strap section 12 forms a loop because of the different lengths.

Figure 2:
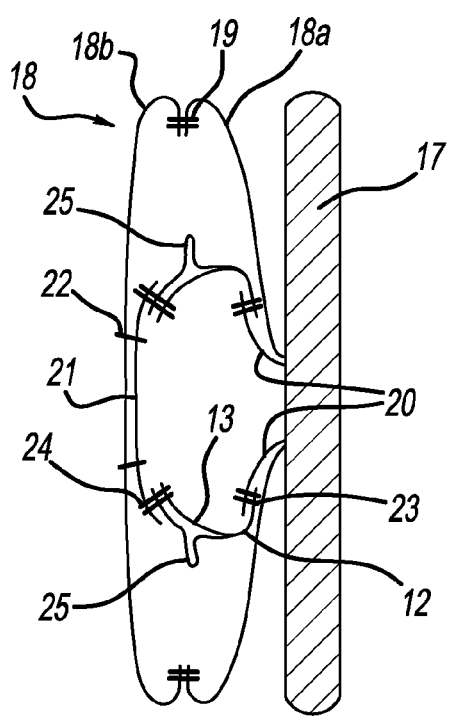
FIG. 2 shows an airbag with two rebound straps arranged inside during the first inflation stage prior to tensioning of the respective first section of the rebound strap in a schematic lateral view.
Figure 3:
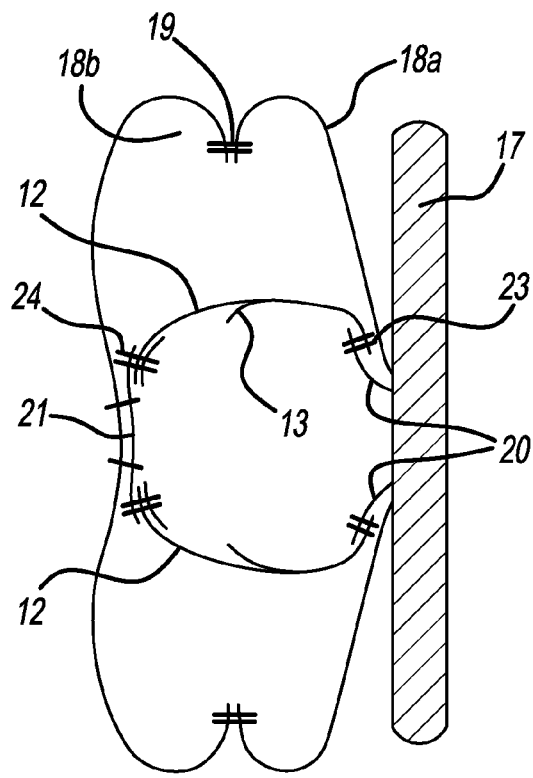
FIG. 3 shows the airbag per FIG. 2 during the second stage of inflation prior to tensioning of the second section of the rebound strap.

As shown in FIGS. 2 and 3, two rebound straps 10 formed per FIG. 1 are arranged inside an airbag 18, attached to fastening panel 17.

Airbag 18 is formed by material cuts 18a and 18b, sewn together via connecting seams 19. Material cut 18a is attached to panel 17, as well as a reinforcement layer 20 for the attachment of rebound strap 10. In this exemplary embodiment, a reinforcement layer 21 is attached to the central area of the other material cut 18b with a preferably circumferential seam 22, with reinforcement layer 21 also intended for the attachment of rebound strap 10.

Figure 4:
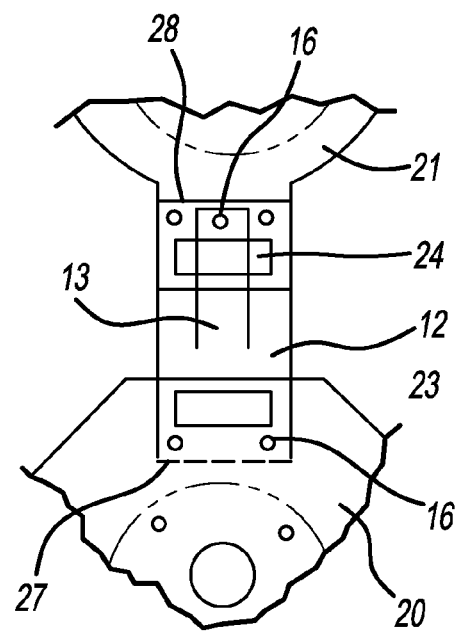
FIG. 4 shows the rebound strap tensioned between its attachments to the airbag sections in a schematic top view.

As shown in FIG. 2 and FIG. 4, each rebound strap 10 is connected at its one end 27 by means of rectangular fastening seams 23 to reinforcement layer 20. The other end 28 of the second longer rebound strap section 12, together with free end 26 of the first shorter rebound strap section 13, is connected to the material of reinforcement layer 21 with a rectangular fastening seam 21, resulting in a single connection seam through all three layers of material. It is clear that the second longer restraining section 12 will form a loop 25 when attached.

In the partially inflated state shown in FIG. 2, the unfolding of airbag 18 has begun; however, the first shorter rebound strap section 13 of each rebound strap 10 has not yet been tensioned.

Comparison with FIG. 2 shows that in the inflated state depicted in FIG. 3, the airbag 18 is already inflated to the extent that the inflation pressure has led to rupture of the first shorter section rebound strap section 13, so that the second longer section 12 of rebound strap 10 may extend further, until the preset inflation configuration of airbag 18 determined by the length of the second longer rebound strap section is established.

The status of the second longer section 12 of rebound strap 10 with the no longer visible loop including the first shorter section of rebound strap 13 is shown once more in FIG. 4 in a top view.

The characteristics of the object of these documents disclosed in the above description, patent claims, summary and drawing may be of importance individually as well as in any combinations with each other, for the realization of this invention in its various forms of execution.

While the above description constitutes the preferred embodiment of the present invention, it will be appreciated that the invention is susceptible modification, variation and change without departing from the proper scope and fair meaning of the accompanying claims.

The invention claimed is:

1. An airbag for an airbag module for installation in a motor vehicle with the airbag made from airbag material and having an inflation device for the airbag, the airbag folded prior to triggering of the inflation device, the airbag comprising a restraining strap in the interior of the airbag with at least a first section and a second section for the controlled inflation of the airbag, the restraining strap attached to portions of the airbag that move in opposite directions upon inflation of the airbag by the inflation device and attached in such manner that the first section of the restraining strap which is shorter than the second section will be stretched until reaching a predetermined ultimate stress level during a first stage of the inflation, and following a rupture of the first section of the restraining strap, the portions of the airbag will move in opposite directions until the stretching of the second section of the restraining strap, with the inflated state of the airbag determined at least in part by the second section of the restraining strap, the restraining strap and the first and second sections formed by a single piece of material with a perimeter cut of the material defining the length and width of the second section of the restraining strap and opposite ends of the second section attached to the respective portions of the airbag moving in opposite directions, and the first section of the restraining strap formed by a flap with reduced width and shorter length than the second section of the restraining strap, and formed from the material with respectively arranged inside cuts in the material within the perimeter cut and remaining connected with one end to part of the material, and the other cut-off end attached to the respective end of the second section of the restraining strap, thus forming a loop.

2. An airbag according to claim 1, further comprising the inside cuts in the material forming the first section of the restraining strap are formed in a U-shaped arrangement, so that the flap of the restraining strap will remain connected to the second section of the restraining strap along a connected side of the material arranged in the U-shaped arrangement.

3. An airbag according to claim 1 further comprising a cut-off end of the flap forming the first section of the restraining strap is attached to an end of the second section of the restraining strap with stitches.

4. An airbag according to claim 2 further comprising a cut-off end of the flap forming the first section of the restraining strap is attached with a stitching to the end of the second section of the restraining strap, and the material of the airbag.

5. An airbag according to claim 1 further comprising two of the restraining straps arranged inside the airbag in a parallel relationship, with ends of the restraining straps connected to respective reinforcements attached to the airbag portions moving in opposite directions.

\* \* \* \* \*